United States Patent

Newman et al.

[11] 3,990,915
[45] Nov. 9, 1976

[54] PRIMARY CELL FOR ELECTRIC BATTERIES

[75] Inventors: Gerald H. Newman; Joseph A. Shropshire, both of Westfield, N.J.

[73] Assignee: Exxon Research and Engineering Company, Linden, N.J.

[22] Filed: Aug. 5, 1975

[21] Appl. No.: 602,142

[52] U.S. Cl. ............................... 429/194; 429/218
[51] Int. Cl.² .................................... H01M 6/00
[58] Field of Search ............ 136/83 R, 100 R, 155, 136/6 LN, 120 R, 20, 22, 121, 122

[56] References Cited
UNITED STATES PATENTS

| | | |
|---|---|---|
| 3,700,502 | 10/1972 | Watanabe et al. ........... 136/100 R X |
| 3,852,113 | 12/1974 | Yokata et al. ..................... 136/83 R |
| 3,871,916 | 3/1975 | Kronenberg ..................... 136/6 LN |
| 3,892,590 | 7/1975 | Gunther ............................ 136/83 R |

Primary Examiner—John H. Mack
Assistant Examiner—C. F. LeFevour
Attorney, Agent, or Firm—Joseph J. Dvorak

[57] ABSTRACT

In an electrochemical cell utilizing an alkali metal anode and a non-aqueous electrolyte there is provided a novel cathode formed by reacting a crystaline form of carbon, such as graphite, with an interhalogen fluoride in the presence of hydrogen fluoride. The preferred interhalogen fluoride is $ClF_3$.

9 Claims, 2 Drawing Figures

FIGURE 2

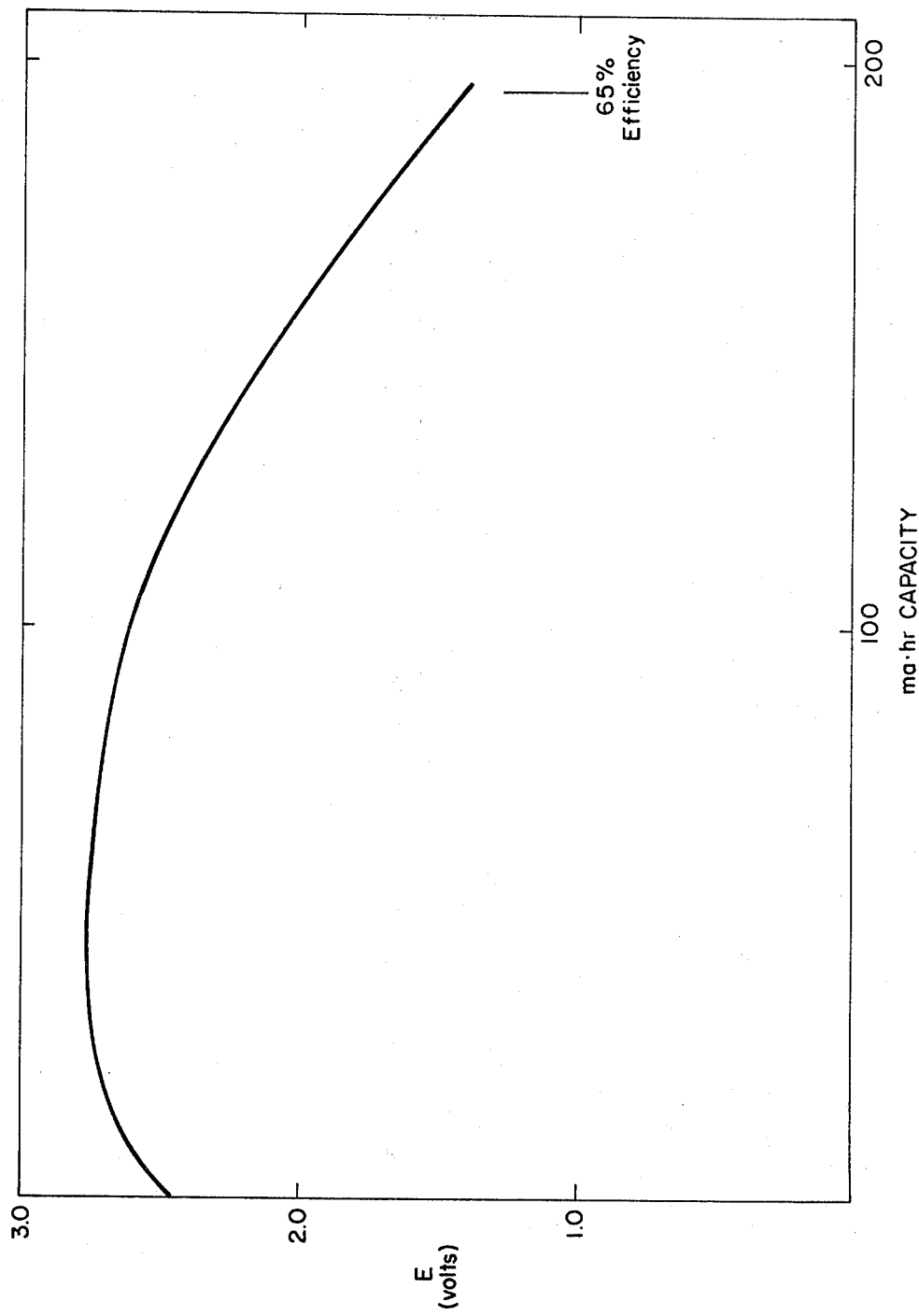

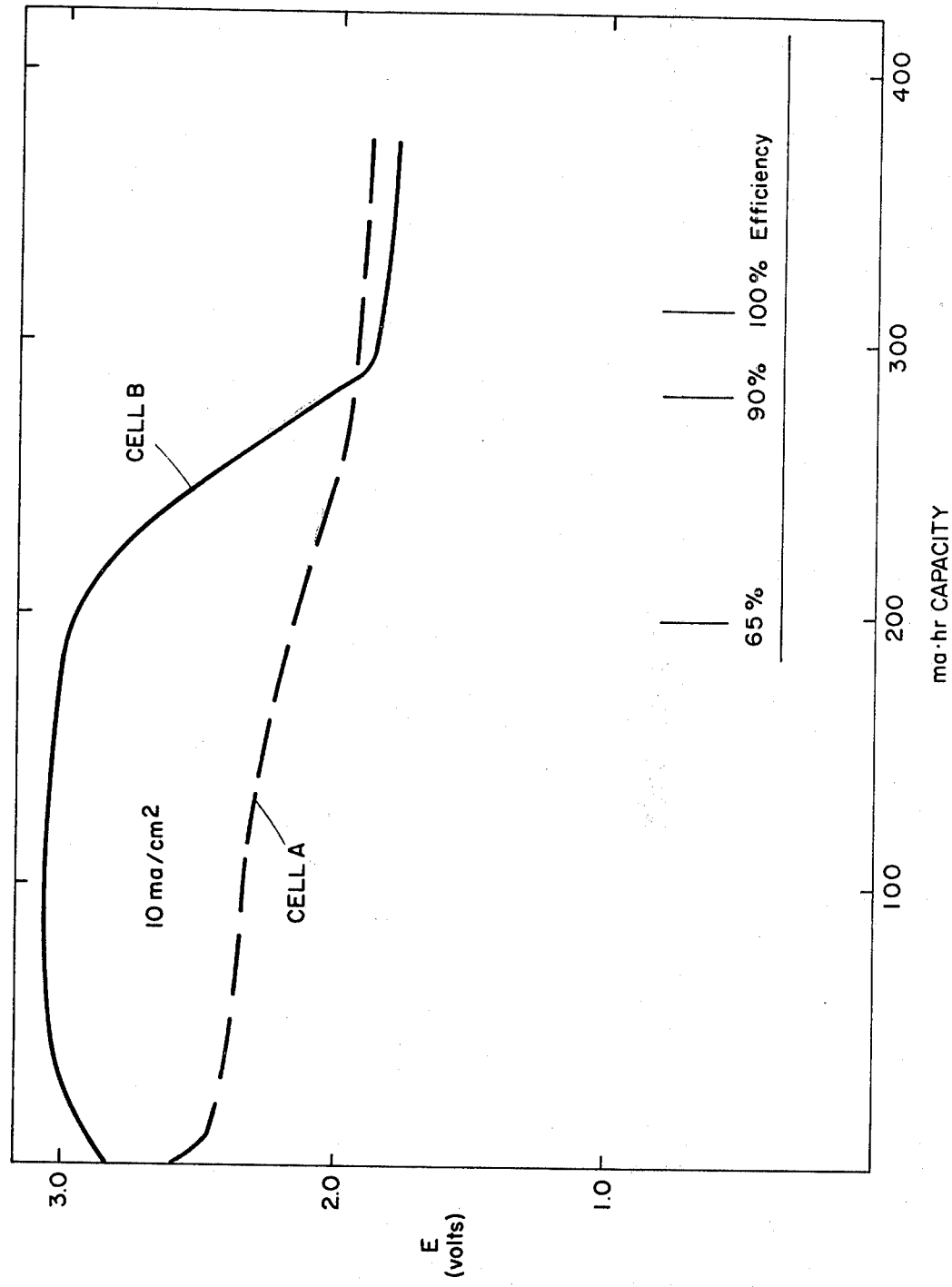

PRIMARY CELL FOR ELECTRIC BATTERIES

BACKGROUND OF THE INVENTION

1. Field of the Invention

This invention relates to a novel electric current producing cell. More particularly this invention relates to improvements in the electric current producing primary cells of the type comprising an alkali metal anode, a non-aqueous electrolyte, and a relatively lightweight cathode of a fluorinated carbon material.

2. Description of the Prior Art

There has been considerable interest in recent years in developing high energy density batteries or voltaic cells. Among the systems being investigated are those employing (a) organic liquids as solvents for the electrolyte; (b) lightweight metals, such as alkali metals, as anodes; and (c) compounds of carbon, particularly fluorine compounds of carbon as cathode-active materials. In this regard, mention is made of U.S. Pat. Nos. 3,536,532 and U.S. Pat. No. 3,514,337.

SUMMARY OF THE INVENTION

A novel electric current-producing cell of the present invention comprises: (a) a cathode formed by reacting graphite with an interhalogen fluoride in the presence of hydrogen fluoride; (b) an alkali metal anode; and, (c) a non-aqueous electrolyte solution.

In a preferred embodiment of the present invention, the cathode of the cell is formed by reacting graphite with chlorine trifluoride in the presence of hydrogen fluoride. The anode preferably is lithium and the electrolyte preferably is a solution of an inorganic lithium salt in an organic solvent.

BRIEF DESCRIPTION OF THE DRAWINGS

FIG. 1 is a discharge curve for a cell employing the novel cathode-active material of the present invention.

FIG. 2 is a side-by-side comparison of discharge curves for a cell employing the novel cathode-active material of the present invention and a cell employing a fluorinated carbon cathode of the prior art.

DETAILED DESCRIPTION OF THE INVENTION

A novel electric current producing cell of the present invention consists of an anode, a cathode and a non-aqueous electrolyte solvent system.

The anode in the present cell is selected from alkali metals. Preferably the anode is lithium metal. The alkali metal, for example lithium, may be in contact with other metal structures such as nickel or silver screen which serves as a current collector.

The cathode of the present current producing cell is a compound of carbon which is formed by reacting a crystalline form of carbon such as natural or pyrolytic graphite, with an interhalogen fluoride in the presence of hydrogen fluoride. Preferably the interhalogen fluoride is selected from $ClF_3$, $ClF_5$, $BrF_3$, $BrF_5$, and $IF_5$. The interhalogen fluoride especially preferred is chlorine trifluoride.

The cathode-active material is prepared very simply by suspending the crystalline carbon, such as graphite, in liquid hydrogen fluoride. Thereafter, an interhalogen compound, such as chlorine trifluoride, is added and the suspension is stirred for a time sufficient for the chlorine trifluoride to react with the carbon compound. Generally, excess interhalogen fluoride is added to the carbon suspension in liquid HF.

With respect to the material which results from the reaction of chlorine trifluoride and graphite, in liquid HF, it has been suggested that this material is represented by the formula $C_{14}H_2F_3ClF_2HF_2$. See, for example, Russian Journal of Inorganic Chemistry, Vol. 17 No. 10 pp. 1366-1368 (1972).

Solutions of inorganic alkali metal salts in organic solvents are used as the electrolyte of the present cell. Preferably the alkali metal salt will contain the same alkali metal as the alkali metal of the anode. Preferred alkali metal salts include $LiPF_6$, $LiClO_4$ and $LiBF_4$. Preferred solvents include tetrahydrofuran, dimethoxyethane, dimethylsulfite, ethylene carbonate, ethylformamide, dioxolane, propylene carbonate and mixtures thereof. Preferably the organic solvent is selected from tetrahydrofuran, dimethoxyethane, dimethylsulfite and mixtures thereof. Indeed, especially preferred organic solvents include mixtures of tetrahydrofuran and dimethoxyethane, and mixtures of dimethylsulfite and dimethoxyethane in the volume ratio of 50:50 for the former and 70:30 for the latter. The concentration of salt in such organic solvents will range generally from about 1 molar to about 2.5 molar, preferably in a range of about 2 molar to about 2.5 molar.

EXAMPLE 1

A two compartment cell was constructed using a filter paper to separate the two compartments. The anode consisted of a lithium ribbon pressed on expanded nickel metal screen. The cathode in the second compartment consisted of a green intercalation compound of graphite formed by mixing excess chlorine trifluoride with a suspension of graphite in liquid HF. This compound was also pressed on an expanded metal screen. The cell was filled with 2 molar $LiPF_6$ solution in dimethylsulfite. The open circuit voltage of the cell was 3.24. The cell was discharged at a current density of 10 mA/cm². The discharge curve is shown in FIG. 1.

EXAMPLE 2

Following the procedure and structure as in Example 1, other electrolytes in place of the 2 molar $LiPF_6$ and dimethylsulfite were tested with the results set forth in Table I. In the table, THF stands for tetrahydrofuran; DME stands for dimethoxyethane; and DMSI stands for dimethylsulfite.

TABLE I

| Run No. | Salt | Concentration | Solvent | Open Voltage | Discharge Current | Average Voltage | Ma/hr* gm |
|---|---|---|---|---|---|---|---|
| 1 | $LiPF_6$ | 3 molar | THF/DME | 3.24 | 5 mA/cm² | 2.3 | 187 |
| 2 | $LiClO_4$ | 2 molar | THF/DME | 3.24 | 5 mA/cm² | 2.4 | 392 |
| 3 | $LiClO_4$ | 2 molar | DMSI/DME | 3.24 | 10 mA/cm² | 2.8 | 592 |
| 4 | $LiPF_6$ | 2 molar | DMSI | 3.24 | 10 mA/cm² | 2.4 | 380 |

*To 2.0V Cut-off

EXAMPLE 3

For comparative purposes, two cells were constructed and discharged identically. These cells had a lithium anode of lithium ribbon pressed on an expanded nickel screen. The cathode active material was also pressed on an expanded nickel screen. The anode and cathode were separated by placing the cathode in a microporous polypropylene bag sold under the name Celgard by Celanese Corporation of America, New York. A glass mat was also placed between the anode and the cathode. The cell was also provided with a reference lithium electrode of lithium ribbon pressed on a nickel screen. The reference electrode was also separated from the cathode by a glass mat. The reference electrode was located on the side of the cathode opposite the anode. The electrolyte used was a 2 molar solution of $LiClO_4$ in a mixture of dimethylsulfite and dimethoxyethane in the volume ratio of 70:30.

In the one cell, designated in FIG. 2 as Cell A, the cathode active material was of the type described in U.S. Pat. No. 3,536,532 and represented by the formula $(CF_{0.5})_n$. In the other cell, designated in FIG. 2 as Cell B, the cathode active material was a compound formed by reacting excess $ClF_3$ with graphite suspended in liquid HF.

Each cell, which had a theoretical capacity of 310 mA.hrs, was discharged at a current density of 10 mA/cm². It can be seen from the discharge curves set forth in FIG. 2, that the difference in performance of the two cathode active materials is quite remarkable. The cell made, according to the present invention, had a flat discharge of about 3 volts for 65 percent of the theoretical capacity. In fact, the cell was 95% efficient to 2.0 volts whereas the cell using the fluorinated carbon, $(CF_{0.5})_n$, was consistently 600 to 700 millivolts lower during discharge.

The foregoing description is intended as illustrative of the invention and not a limitation thereof.

What is claimed is:
1. A current producing cell comprising:
   a cathode formed by reacting crystalline carbon with an interhalogen fluoride in the presence of hydrogen fluoride, said interhalogen fluoride being selected from the group consisting of $ClF_3$, $ClF_5$, $BrF_3$, $BrF_5$, and $IF_5$;
   an alkali metal anode; and
   an alkali metal salt in an organic solvent as a nonaqueous electrolyte system.
2. The cell of claim 1 wherein the interhalogen fluoride is $ClF_3$.
3. The cell of claim 1 wherein the crystalline carbon material is graphite.
4. The cell of claim 3 wherein the anode is lithium and the alkali metal salt of the electrolyte is selected from $LiPF_6$, $LiClO_4$, and $LiBF_4$.
5. The cell of claim 4 wherein the organic solvent is selected from tetrahydrofuran, dimethoxyethane and dimethylsulfite and mixtures thereof.
6. An electric cell comprising:
   a cathode formed by reacting graphite with chlorine trifluoride in the presence of HF;
   a lithium metal anode; and
   an organic electrolyte system formed by dissolving salts selected from the group consisting of $LiClO_4$, $LiPF_6$ and $LiBF_4$ in a solvent selected from the group consisting of dimethylsulfite, tetrahydrofuran and dimethoxyethane and mixtures thereof.
7. The cell of claim 6 wherein the electrolyte is a solution of $LiPF_6$ and a mixture of tetrahydrofuran and dimethoxyethane.
8. The cell of claim 6 wherein the electrolyte is $LiClO_4$ dissolved in a mixture of tetrahydrofuran and dimethoxyethane.
9. The cell of claim 6 wherein the electrolyte is $LiClO_4$ dissolved in a mixture of dimethylsulfite and dimethoxyethane.

* * * * *